| (12) | United States Patent | (10) Patent No.: | US 10,801,328 B2 |
|---|---|---|---|
| | Luh | (45) Date of Patent: | Oct. 13, 2020 |

(54) ROTARY ACTUATOR AND APPLICATION THEREOF

(71) Applicant: Chuh Hwa Luh, Yilan (TW)

(72) Inventor: Chuh Hwa Luh, Yilan (TW)

( * ) Notice: Subject to any disclaimer, the term of this patent is extended or adjusted under 35 U.S.C. 154(b) by 0 days.

(21) Appl. No.: 16/381,599

(22) Filed: Apr. 11, 2019

(65) Prior Publication Data

US 2020/0270994 A1     Aug. 27, 2020

(30) Foreign Application Priority Data

Feb. 26, 2019   (TW) .............................. 108106555 A

(51) Int. Cl.
  *F01D 5/14*           (2006.01)
(52) U.S. Cl.
  CPC .......... *F01D 5/141* (2013.01); *F05D 2210/13* (2013.01); *F05D 2240/305* (2013.01)

(58) Field of Classification Search
  CPC ............ F15B 2015/208; F15B 15/1485; F15B 21/042; F15B 21/0427; F15B 15/04; F15B 15/12; F15B 15/17; F01D 5/141
  See application file for complete search history.

(56) References Cited

U.S. PATENT DOCUMENTS 10,400,602 B2 *   9/2019   Ito ........................ F01C 11/002

* cited by examiner

*Primary Examiner* — Abiy Teka
(74) *Attorney, Agent, or Firm* — Donald E. Stout; Stout, Uxa & Buyan, LLP

(57) ABSTRACT

A specially designed rotary actuator comprising a sealed container and a piston rotor located in the sealed container. The piston rotor divides the sealed container into a first space and a second space having different pressures. The first end of the piston rotor faces the first space and includes a plurality of first bores, and the second end of the piston rotor faces the second space and includes a plurality of second bores. The depth of the first and second bores is less than the thickness of the piston rotor. Each of the first and second bores comprises a first portion and a second portion, wherein the surface area of the first portion is greater than the surface area of the second portion.

17 Claims, 13 Drawing Sheets

ROTARY ACTUATOR AND APPLICATION THEREOF

CROSS-REFERENCE TO RELATED APPLICATIONS

The entire contents of Taiwan Patent Application No. 108106555, filed on Feb. 26 2019, from which this application claims priority, are expressly incorporated herein by reference.

BACKGROUND OF THE INVENTION

1. Field of the Invention

In one general aspect, the present invention relates to rotary actuators and their applications.

2. Description of Related Art

Conventional rotary power devices, such as turbines, blowers, etc., utilize a pressure drop between two points of a fluid network to propel an impeller having geometric blades to generate power.

A turbine is a rotary mechanical device that extracts energy from a fluid flow and converts it into mechanical energy, or vice versa. The working substance of the turbine can be either a gas or a liquid. A turbine that utilizes water as the working substance is called a water turbine, utilizes steam as the working substance is called a steam turbine, and utilizes a gas as the working substance is called a combustion turbine engine, that is, a gas turbine.

The power devices must be efficient and prevent leakage. For example, Chinese Patent No. CN108368744A discloses a sealing fin, a sealing structure, and a turbine capable of reducing leakage loss.

SUMMARY OF THE INVENTION

In one general aspect, the present invention relates to rotary actuators and their applications.

In one embodiment of this invention, a rotary actuator is provided with a sealed container and a piston rotor. The piston rotor is disposed in the sealed container to divide the sealed container into a first space and a second space with a pressure difference therebetween. The piston rotor comprises a first end facing the first space and a second end facing the second space, the first end comprises a plurality of first bores, and the second end comprises a plurality of second bores. The depth of each first bore and each second bore is smaller than the thickness of the piston rotor, each first bore and each second bore comprise a first portion and a second portion, and the surface area of the first portion is greater than the surface area of the second portion.

In one embodiment, the first space is filled with a first fluid, the second space is filled with a second fluid, and the first fluid and the second fluid are selected from the group consisting of a saturated liquid, a saturated vapor, a saturated gas, a superheated vapor, or a superheated gas.

In one embodiment, the pressure of the first space is less than the pressure of the second space. In addition, the first fluid comprises a saturated liquid comprising a hydraulic oil or a lubricating oil, and the second fluid comprises a refrigerant comprising chlorofluorocarbons (CFCs).

In one embodiment, the sealed container is operated with an adiabatic process.

In one embodiment, the sealed container is operated with a non-adiabatic process.

In one embodiment, the rotary actuator further comprises a control system for controlling the temperature and pressure of the first space and/or the second space, so as to control the rotating speed of the piston rotor.

In one embodiment, the number of the plurality of first bores or the number of the plurality of second bores is odd or even.

In one embodiment, the plurality of first bores and the plurality of second bores are alternately arranged.

In one embodiment, the surface area of the first portion of the second bore is larger than the surface area of the second portion of the first bore, and the surface area of the second portion of the second bore is less than the surface area of the first portion of the first bore.

In one embodiment, the center of the piston rotor includes a shaft, and the rotation of the piston rotor drives the shaft to rotate.

In one embodiment, one end of the shaft protrudes from the sealed container and is coupled to a shaft drive device or a transmission device.

In one embodiment, one end of the shaft protrudes from the sealed container and is connected to propellers or is connected to the propellers via a transmission device.

In one embodiment, the rotary actuator further comprises a magnet set and a coil, wherein one end of the shaft protrudes from the sealed container and is connected to the magnet set, and the magnet set is within the coil.

In one embodiment, the rotary actuator further comprises a magnet set and a coil, wherein one end of the shaft protrudes from the sealed container and is connected to the coil, and the coil is disposed within a magnetic field of the magnet set.

In another embodiment of this invention, a rotary actuator is provided with a sealed container and N piston rotors. The N piston rotors are disposed in the sealed container to divide the sealed container into N+1 spaces, wherein N is a positive integer, and each of the piston rotors is sandwiched between two of the N+1 spaces with a pressure difference therebetween. Each of the piston rotors comprises a first end and a second end, the first end comprises a plurality of first bores, and the second end comprises a plurality of second bores. The depth of each first bore and each second bore is smaller than the thickness of the piston rotor, each first bore and each second bore comprise a first portion and a second portion, and the surface area of the first portion is greater than the surface area of the second portion.

In another embodiment of this invention, a rotary actuator is provided with a sealed container and a piston rotor. The piston rotor is disposed in the sealed container to divide the sealed container into a first space and a second space having a pressure difference therebetween. The piston rotor comprises a first end facing the first space and a second end facing the second space. The first end comprises a plurality of first bores, and the second end comprises a plurality of second bores. The plurality of first bores and the a plurality of second bores are alternately arranged, and a depth of each of the plurality of first bores and each of the plurality of second bores is smaller than a thickness of the piston rotor. A membrane is disposed at the interface of each pair of the first bore and the second bore, and the membrane is deformed under the pressure difference to drive the piston rotor rotating.

DETAILED DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts. It should be noted that any drawings presented are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawing. Such directional terms should not be construed to limit the scope of the invention in any manner.

Figure 1:
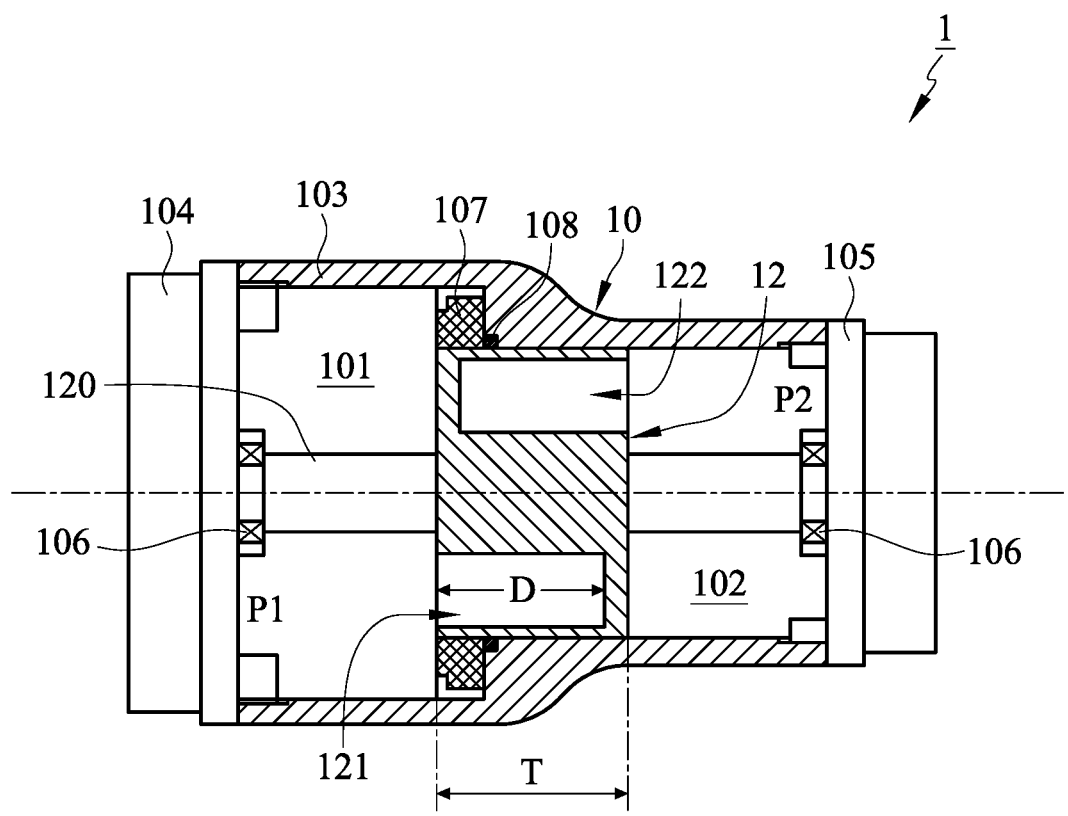
FIG. 1 is a cross-sectional view of a rotary actuator in accordance with an embodiment of the present invention.
Figure 2:
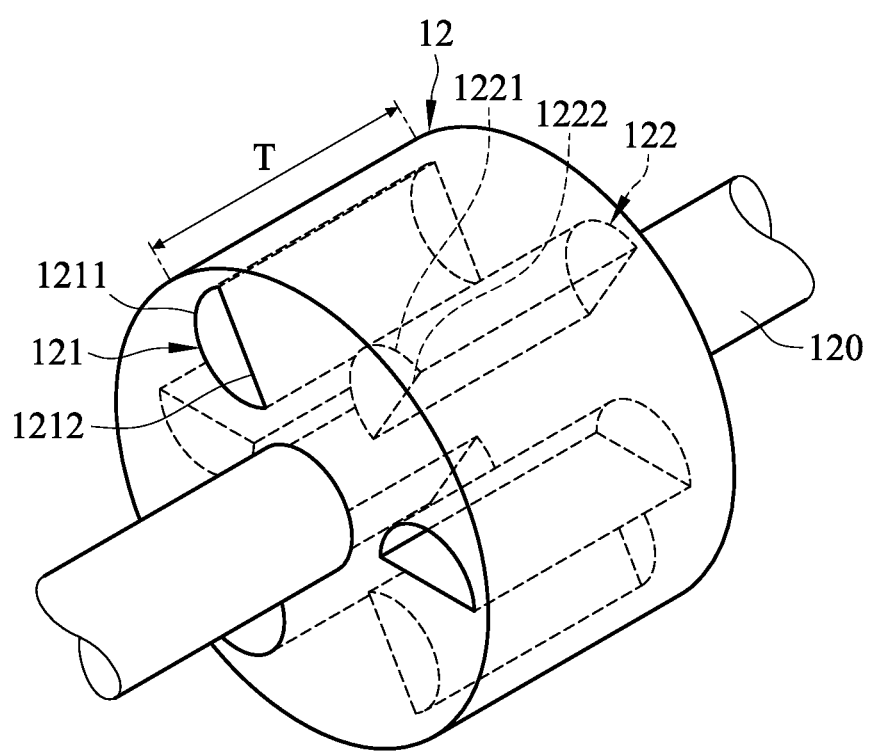
FIG. 2 is a schematic view of a piston rotor of a rotary actuator according to an embodiment of the present invention.

FIG. 1 is a cross-sectional view of a rotary actuator 1 in accordance with a preferred embodiment of the present invention. FIG. 2 is a schematic view of a piston 12 of the rotary actuator 1 in accordance with an embodiment of the present invention. As shown in FIGS. 1 and 2, the rotary actuator 1 mainly includes a sealed container 10 and a piston rotor 12. The piston rotor 12 is disposed in the sealed container 10 and includes a shaft 120, and the left and right ends of the shaft 120 connect the left and right inner side walls of the sealed container 10, respectively.

Referring to FIG. 1 and FIG. 2, preferably, the piston rotor 12 is cylindrical and has a thickness T, and a plurality of first bores 121 are dug parallel to the axial from the left end of the piston rotor 12. The number of the first bores 121 may be odd or even, and the depth D of each first bore 121 is smaller than the thickness T of the piston rotor 12. That is, the first bores 121 are not through the piston rotor 12. Similarly, the right end of the piston rotor 12 includes a plurality of second bores 122 parallel to the axial. The number of the second bores 122 may be odd or even and may equal to the number of the first bores 121, and the depth D of each second bore 122 is smaller than the thickness T of the piston rotor 12. That is, the second bores 122 are not through the piston rotor 12.

Referring to FIG. 1 and FIG. 2, preferably, the first bores 121 and the second bores 122 are alternately arranged and are symmetric with respect to the shaft 120. The cross section of each first bore 121 or second bore 122 is non-circular and may be an irregular shape. The first bore 121 includes at least a first portion 1211 and a second portion 1212, and the surface area of the first portion 1211 is greater than the surface area of the second portion 1212. The second bore 122 has at least a first portion 1221 and a second portion 1222, and the surface area of the first portion 1221 is greater than the surface area of the second portion 1222. For example, in this embodiment, the cross section of each of the first bores 121 and second bores 122 includes a straight segment and an arc segment. Obviously, the surface area of the arc segment will be larger than the surface area of the straight segment. It is to be noted that the first bores 121 and the second bores 122 are not limited to the shape as illustrated in the drawings.

Referring to FIGS. 1 and 2, the piston rotor 12 divides the sealed container 10 into two spaces, a first space 101 and a second space 102. Through a control, the first space 101 and the second space 102 may be filled with saturated fluid (saturated gas or saturated liquid), under a temperature equivalent to the temperature of the external environmental, or under a pressure equivalent to the pressure of the external environmental, such that the first space 101 and the second space 102 can have different pressures as the temperature changes. For example, the pressure P1 of the first space 101 is smaller than the pressure P2 of the second space 102. In another embodiment, the pressure P1 of the first space 101 is greater than the pressure P2 of the second space 102. In some embodiments, the first space 101 is filled with a first fluid, and the second space 102 is filled with a second fluid, wherein the first fluid and the second fluid are selected from the group consisting of a saturated liquid, a saturated vapor, a saturated gas, a superheated vapor, or a superheated gas. In one embodiment, the first fluid is different from the second fluid. In one embodiment, the first fluid is the same as the second fluid. In some embodiments, the temperature and/or pressure of the fluids filled in the first space 101 and/or the second space 102 can be controlled. In some embodiments, the space controlled at a relative low pressure is filled with a fluid comprising a saturated gas or a saturated liquid, wherein the saturated liquid comprises a hydraulic oil or a lubricating oil, and the space controlled at a relative high pressure is filled with a fluid comprising a refrigerant, which contains chlorofluorocarbons (CFCs), i.e., compounds containing fluorine (F), chlorine (Cl), carbon (C), such as but not limited to R32, R134a, R404A, R410A, R507, F12, F22, etc., and other known or unknown saturated gases and saturated liquids. The saturation pressure of the fluid is controlled by controlling the saturation temperature of the fluid, or, the pressure of the superheated vapor is controlled by controlling the temperature of the superheated vapor.

Referring to FIGS. 1 and 2, in the first space 101, the force applied to each first bore 121 is equal to the pressure P1 multiplied by the surface area of the first bore 121. Therefore, the force applied to the first portion 1211 of the first bore 121 may be greater than the force applied to the second portion 1212, thereby producing a torque. Similarly, in the second space 102, the force applied to each second bore 122 is equal to the pressure P2 multiplied by the surface area of the second bore 122. Therefore, the force applied to the first portion 1221 of the second bore 122 may be greater than the force applied to the second portion 1222, thereby generating a torque. The torques of the first bores 121 and the second bores 122 may be at an angle between 0-90° relative to the piston rotor 12, with the pressure difference between the first space 101 and the second space 102, and hence form a combined torque to rotate the piston rotor 12 around its center. Due to a thrust bearing 106, the piston rotor 12 is fixed without axial movements. In addition, the volume of the first space 101 and the second space 102 are kept constant, and thus the pressure difference between the first space 101 and the second space 102 can be maintained while the piston rotor 12 is rotating.

Referring to FIGS. 1 and 2, in this embodiment, the sealed container 10 is composed of a housing 103, a first end cap 104, and a second end cap 105. The left and right ends of the shaft 120 of the piston rotor 12 are connected to the inner side wall of the first end cap 104 and the second end cap 105, respectively. The thrust bearings 106 are disposed between the left end of the shaft 120 and the first end cap 104 and between the right end of the shaft 120 and the second end cap 105. The thrust bearings 106 can prevent the piston rotor 12 from being displaced in the axial direction. Further, preferably, a shaft seal 107 is disposed between the periphery of the piston rotor 12 and the first space 101, and the periphery of the piston rotor 12 has an O-ring 108 against the shaft seal 107. In some embodiments, the operation of the sealed container 10 is an adiabatic process, without heat transfer with the external environment, and the pressures P1 and P2 are controlled by controlling the temperatures of the first space 101 and the second space 102. In some embodiments, the sealed container 10 and the piston rotor 12 are made of a material resistant to high temperature and pressure, such as metal, ceramic, or composite materials, and the sealed container 10 may be a cylinder. In another embodiment, the shaft seal 107 is disposed at the junction of the periphery of the piston rotor 12 and the second space 102. In another embodiment, there are two shaft seals 107, where one is disposed between the periphery of the piston rotor 12 and the first space 101 and the other is disposed between the periphery of the piston rotor 12 and the second space 102.

Figure 3:
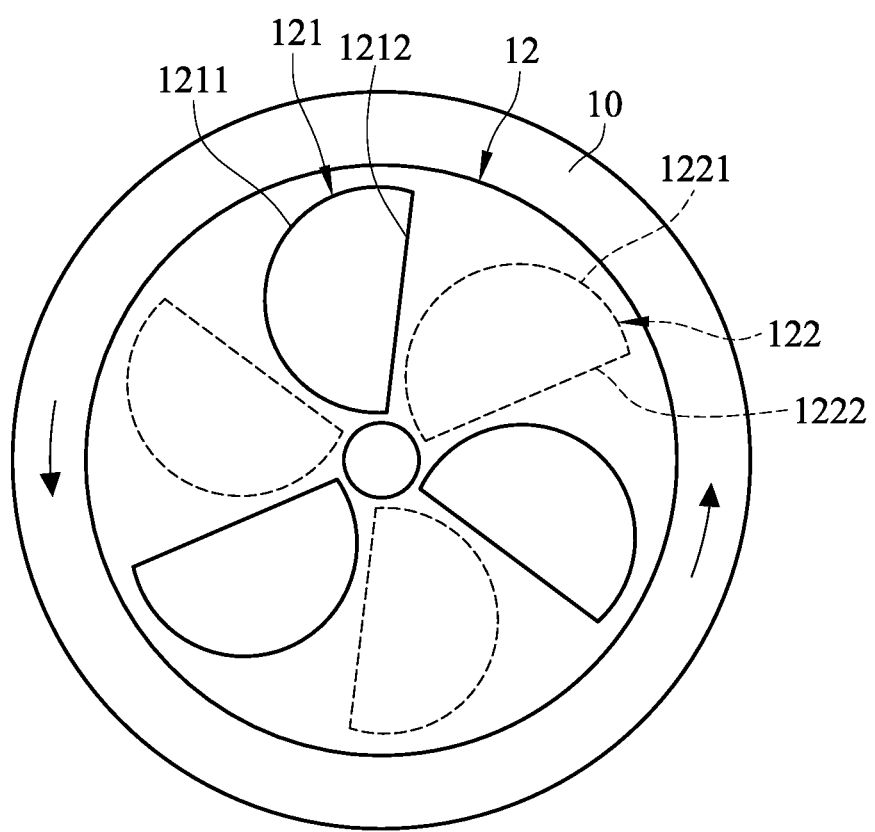
FIG. 3 is a schematic cross-sectional view of a piston rotor of a rotary actuator in accordance with another embodiment of the present invention.

FIG. 3 is a cross-sectional view of a piston rotor 12 of the rotary actuator 10 in accordance with another embodiment of the present invention. As mentioned above, the first bores 121 and second bores 122 may have an irregular shape, wherein the first bore 121 includes at least a first portion 1211 and a second portion 1212, and the surface area of the first portion 1211 is larger than the surface area of the second portion 1212. The second bore 122 includes at least a first portion 1221 and a second portion 1222. The surface area of the first portion 1221 is greater than the surface area of the second portion 1222. In one embodiment, the shape of the first bore 121 is the same as the shape of the second bore 122. In one embodiment, the shape of the first bore 121 is similar to or different from the shape of the second bore 122. In one embodiment, the surface area of the first portion 1221 of the second bore 122 is greater than the surface area of the second portion 1212 of the first bore 121, and/or the surface area of the second portion 1222 of the second bore 122 is less than the surface area of the second portion 1212 of the first bore 121. The combined torque generated by the pressure difference and the first and second bores 121/122 causes the piston rotor 12 to rotate. In an embodiment, the spacing between the first bore 121 and the second bore 122 is as small as possible, thereby saving the material cost and improving the efficiency of the piston rotor 12.

Figure 4:
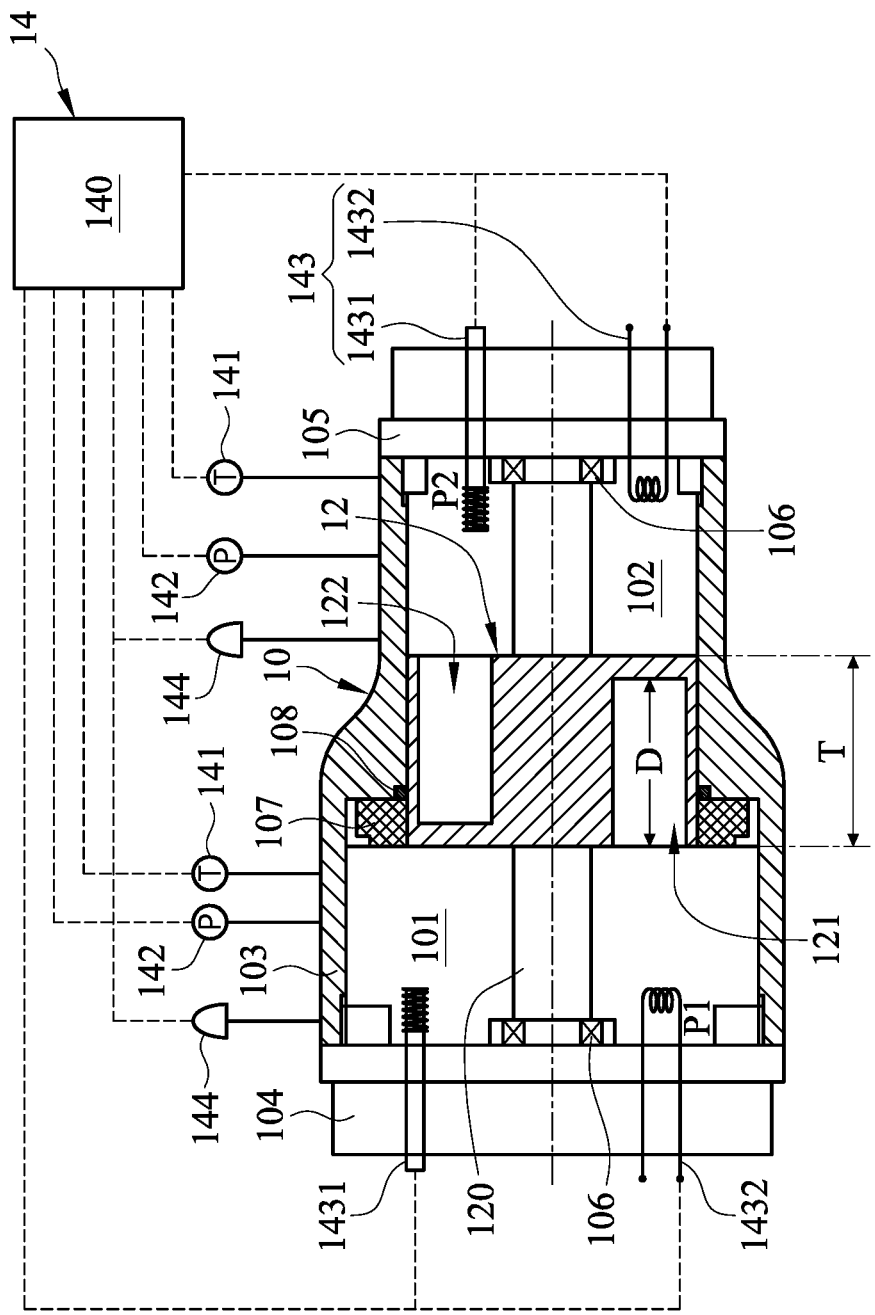
FIG. 4 is a cross-sectional view of a rotary actuator in accordance with another embodiment of the present invention.

FIG. 4 shows a rotary actuator 10 in accordance with an embodiment of the present invention. As shown in FIG. 4, in some embodiments, the rotary actuator 10 further includes a control system 14 that can control the pressure of the first space 101 and/or the second space 102. The control system 14 may include temperature-measuring devices 141 and pressure-measuring devices 142 coupled to a control unit 140 to measure temperature and pressure of the first space 101 and the second space 102. In some embodiments, the control system 14 can further include a temperature control device 143 coupled to the control unit 140 to adjust the pressure of the first space 101 and/or the second space 102 by controlling the temperature of the first space 101 and/or the second space 102, thereby controlling the rotating speed of the piston rotor 12. In one embodiment, the temperature control device 143 includes a heater 1431 and a cooler 1432.

In one embodiment, the temperature control device 143 includes one or more conduits (not shown) disposed within the housing 103 of the sealed container 10. The conduit allows for inputting and/or outputting a coolant, which can be a liquid or a gas. The coolant may be used to adjust the temperature of the first space 101 and/or the second space 102, so as to adjust the pressure of the first space 101 and/or the second space 102. In one embodiment, the control system 14 further includes a safety valve 144 to ensure that the pressure of the first space 101 or the second space 102 does not exceed a predetermined pressure. In one embodiment, the control system 14 further includes a speed measuring device (not shown) for measuring the rotating speed of the piston rotor 12, and a brake device (not shown) for stopping the piston rotor 12.

In some embodiments, the operation of the sealed container 10 is a non-adiabatic process. The temperature inside the sealed container 10 is affected by the external environment, thereby changing the pressure of the first space 101 and/or the second space 102. In one embodiment, when the temperature of the external environment increases, the pressure difference between the first space 101 and the second space 102 increases, thereby increasing the combined torque and rotating speed of the piston rotor 12; when the temperature of the external environment decreases, the pressure difference between the first space 101 and the second space 102 also decreases, thereby reducing the combined torque and the rotating speed of the piston rotor 12.

In one embodiment, the space (the first space 101 or the second space 102) that filled with oil will be the space controlled with a relative low pressure, and a temperature control (without pressure control) is performed at the space controlled with a relative low pressure and a temperature and pressure control is performed at the space controlled with a relative high pressure.

Figure 5:
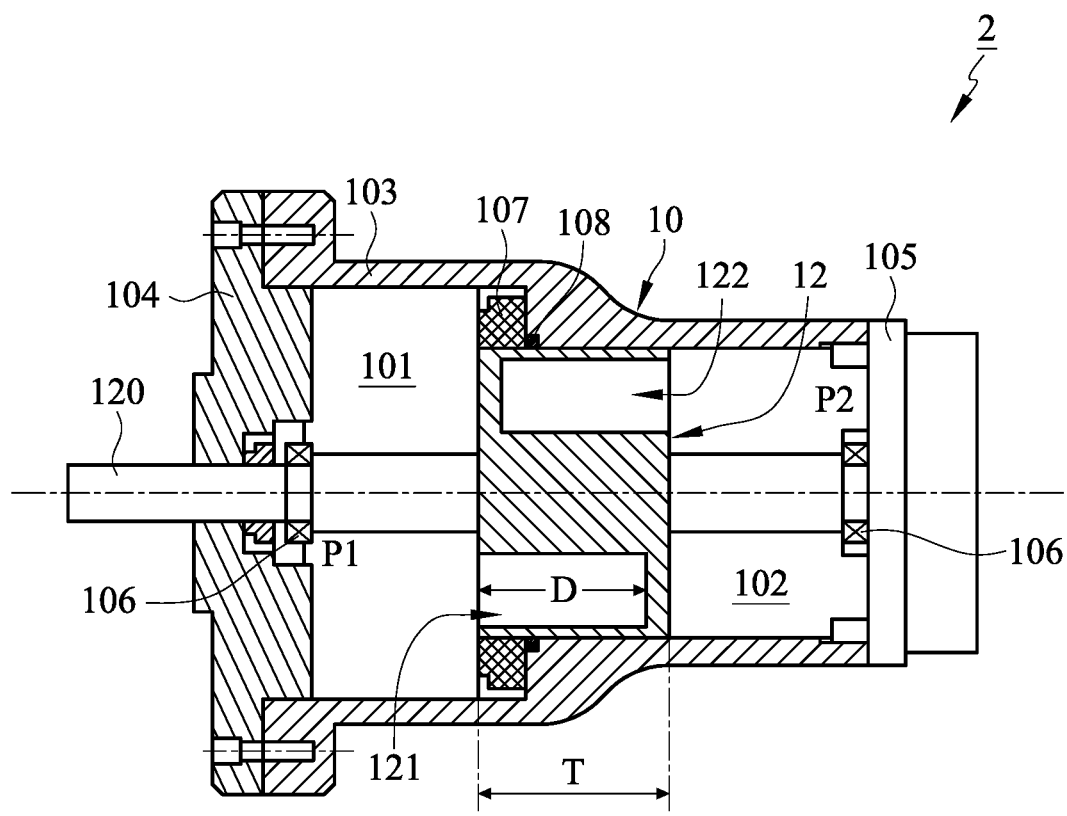
FIG. 5 is a cross-sectional view of a power device in accordance with an embodiment of the present invention.
Figure 8:
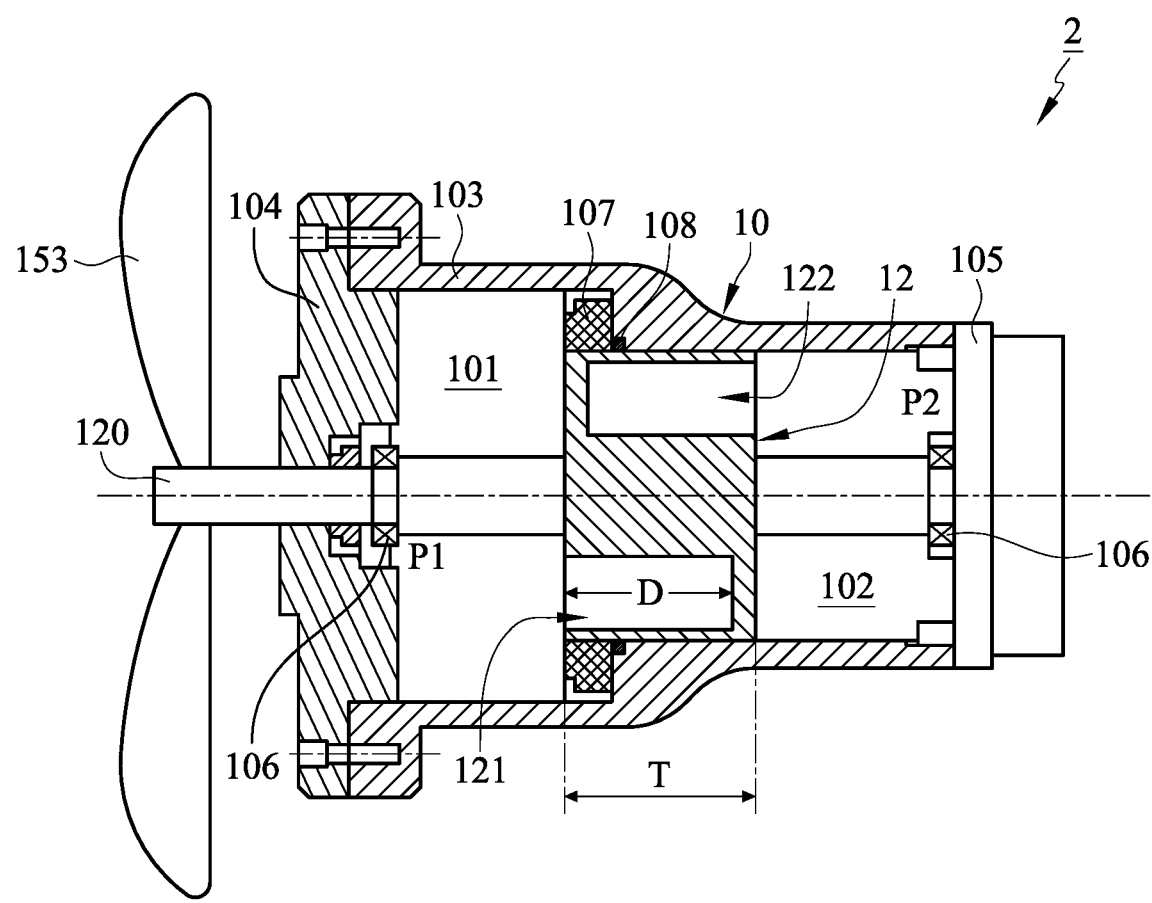
FIG. 8 is a cross-sectional view of a power device in accordance with another embodiment of the present invention.

The rotary actuators of this invention may have a variety of uses. FIG. 5 is a cross-sectional view of a power device 2 in accordance with an embodiment of the present invention. As shown in FIG. 5, the power device 2 may include all components of the rotary actuator 1, which may further include the control system 14 of FIG. 4. In addition, the rotation of the piston rotor 12 drives the shaft 120 to rotate, and one end of the shaft 120 protrudes from the sealed container 10 and is connected to a rotating mechanism or a transmission mechanism (not shown), or is magnetically connected to drive a power equipment (not shown) outside of the sealed container 10. As shown in FIG. 8, in some embodiments, one end of the shaft 120 protrudes from the sealed container 10 and is coupled to propellers 153, or is coupled to the propellers 153 via a transmission device (e.g., belts and/or gears). The power device 2 can be applied to drive propellers of machines such as ships, submarines, underwater vehicles, water jets, or unmanned aerial vehicles.

Figure 6:
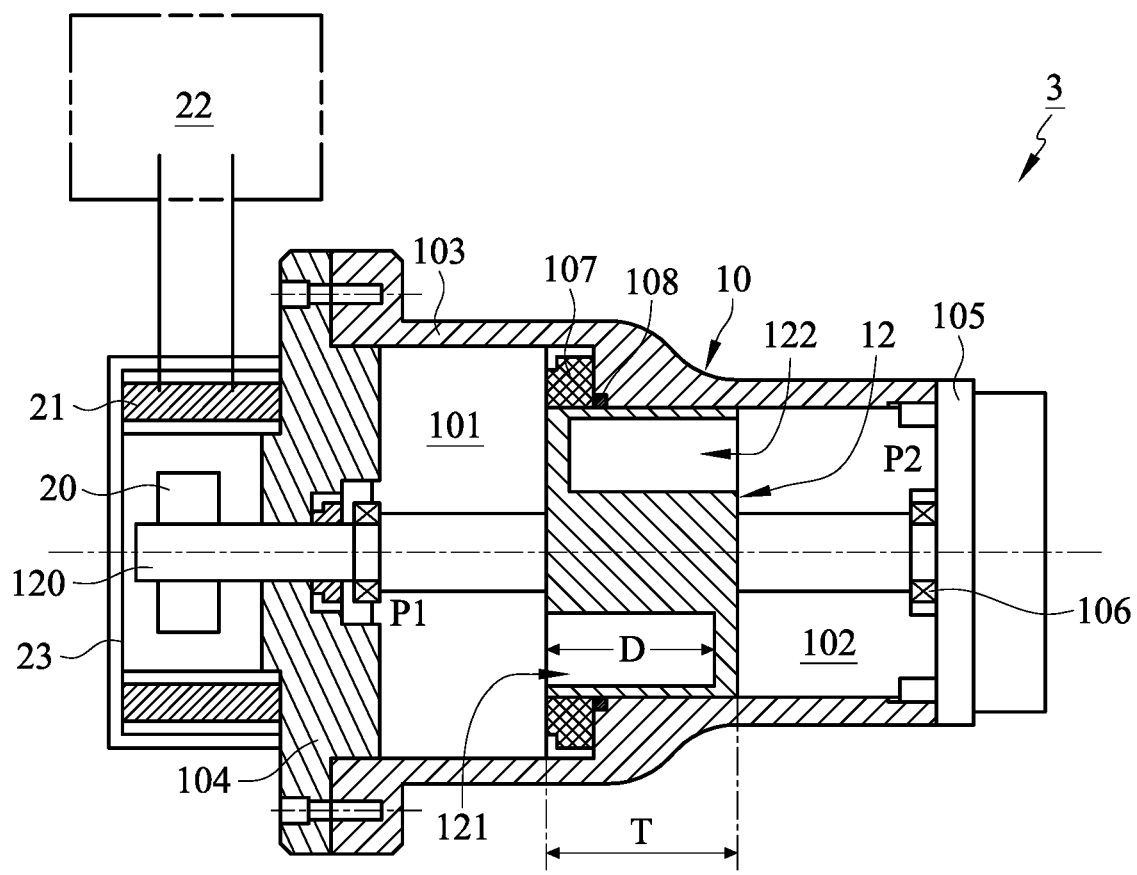
FIG. 6 is a cross-sectional view of a power generating device in accordance with an embodiment of the present invention.

FIG. 6 is a schematic cross-sectional view showing a power generating device 3 according to an embodiment of the present invention. As shown in FIG. 6, the power generating device 3 may include all components of the rotary actuator 1, which may further include the control system 14 of FIG. 4. In addition, one end of the shaft 120 protrudes from the sealed container 10 and is connected to a magnet set 20. Further, a coil 21 is spaced apart from the magnet set 20, and a power storage device 22 is connected to the coil 21. The coil 21 and the magnet set 20 may be disposed within the frame 23. The piston rotor 12 drives the shaft 120 to rotate, the shaft 120 drives the magnet set 20 to rotate, and the coil 21 remains stationary, thereby generating an induced current.

In a power generating device according to another embodiment of the present invention, one end of the shaft 120 protrudes from the sealed container 10 and is connected to a coil disposed between magnet sets. The piston rotor 12 drives the shaft 120 to rotate, and the shaft 120 drives the coil to rotate. By rotating rapidly between the magnet sets, the coil generates an induced current.

Figure 7:
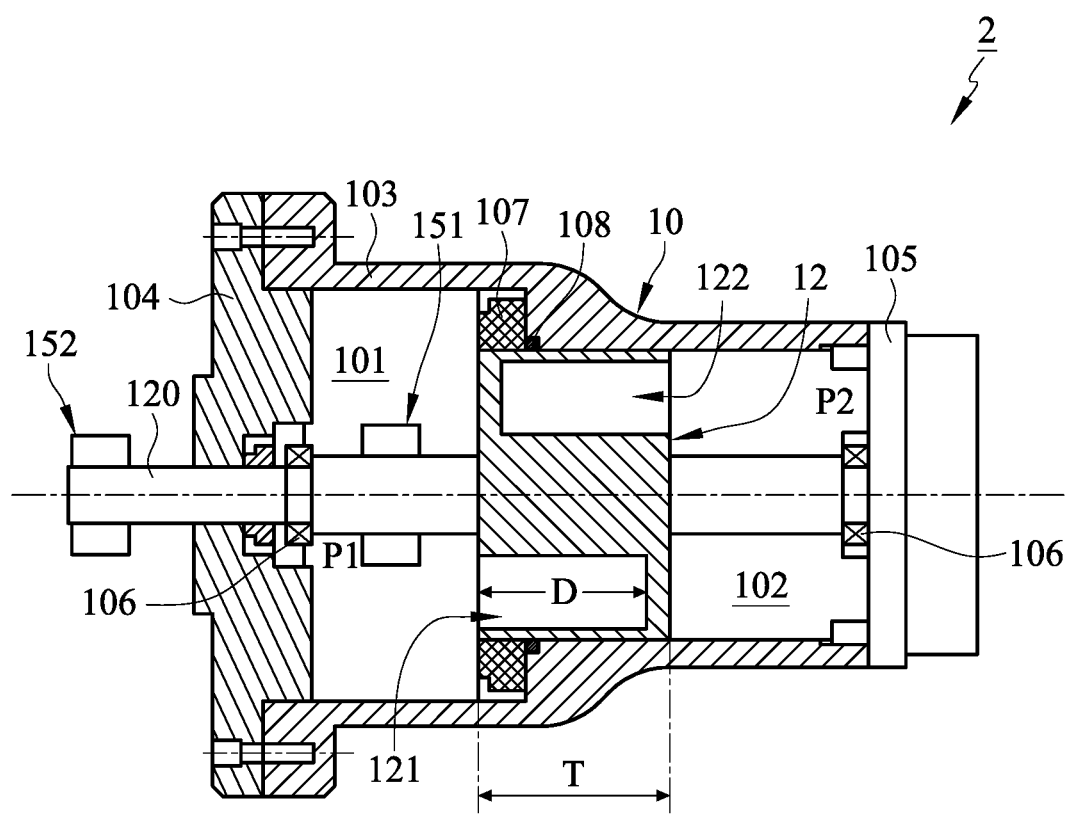
FIG. 7 is a cross-sectional view of a power device in accordance with another embodiment of the present invention.

In some embodiments of the invention, one end of the shaft 120 of the piston rotor 12 protrudes from the sealed container 10 and is connected to a coupling (not shown), so as to drive a shaft drive generator (not shown). Referring to FIG. 7, in a power generating device according to another embodiment of the present invention, an inner magnetic bush 151 is located in the sealed container 10 to drive an opposite outer magnetic bush 152 outside the sealed container, so as to drive a shaft drive generator.

Figure 9:
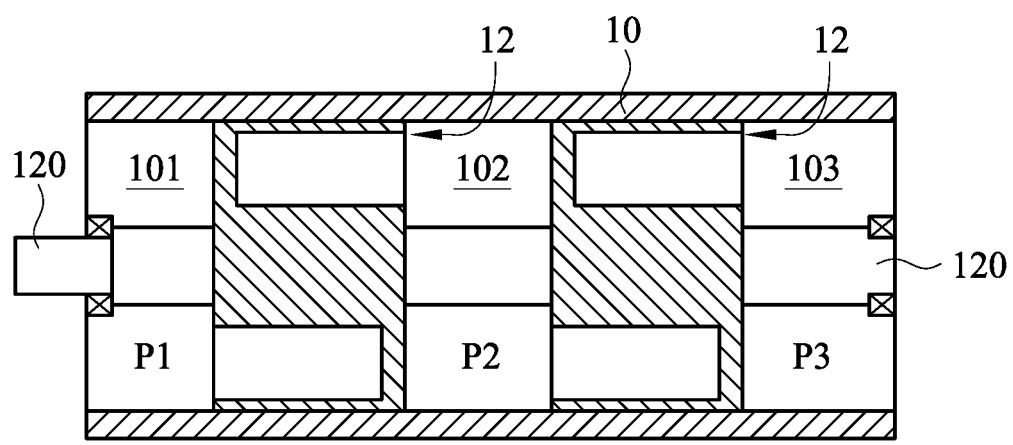
FIG. 9 is a cross-sectional view of a rotary actuator in accordance with another embodiment of the present invention.

In the foregoing embodiments of the present invention, the number of the piston rotors 12 in the sealed container 10 may be two or more. FIG. 9 shows a rotary actuator in accordance with an embodiment of the present invention. In this embodiment, the rotary actuator includes two piston rotors 12, which divide the sealed container 10 into three spaces, a first space 101, a second space 102, and a third space 103. In addition, a first pressure difference (e.g., ΔP1=P2−P1) is between the first space 101 and the second space 102, and a second pressure difference (e.g., ΔP2=P3−P2) is between the second space 102 and the third space 103. The first pressure difference and the second pressure difference will drive the two piston rotors 12 to rotate, and the rotation of 12 the two piston rotors 12 causes the rotation of the shaft 120. By controlling the pressure differences, the plurality of piston rotors 12 can amplify the torque to increase the rotating speed of the shaft 120. Alternatively, by controlling the pressure differences, a torque in the opposite direction can be generated to brake the shaft 120 rotating with a high speed.

Figure 10A:
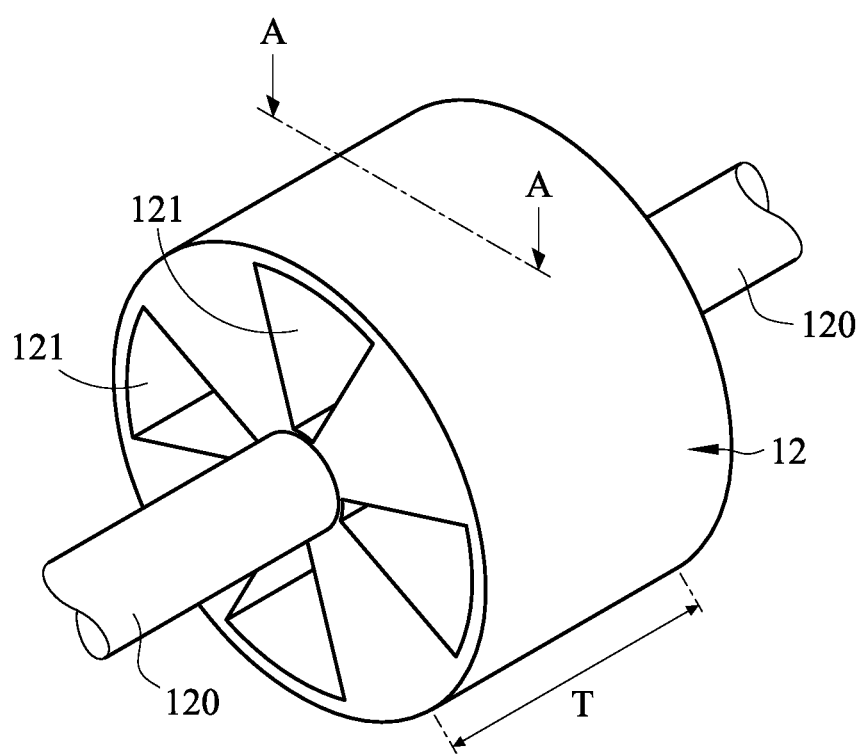
FIG. 10A is a schematic view of a piston rotor of a rotary actuator according to another embodiment of the present invention.
Figure 10B:
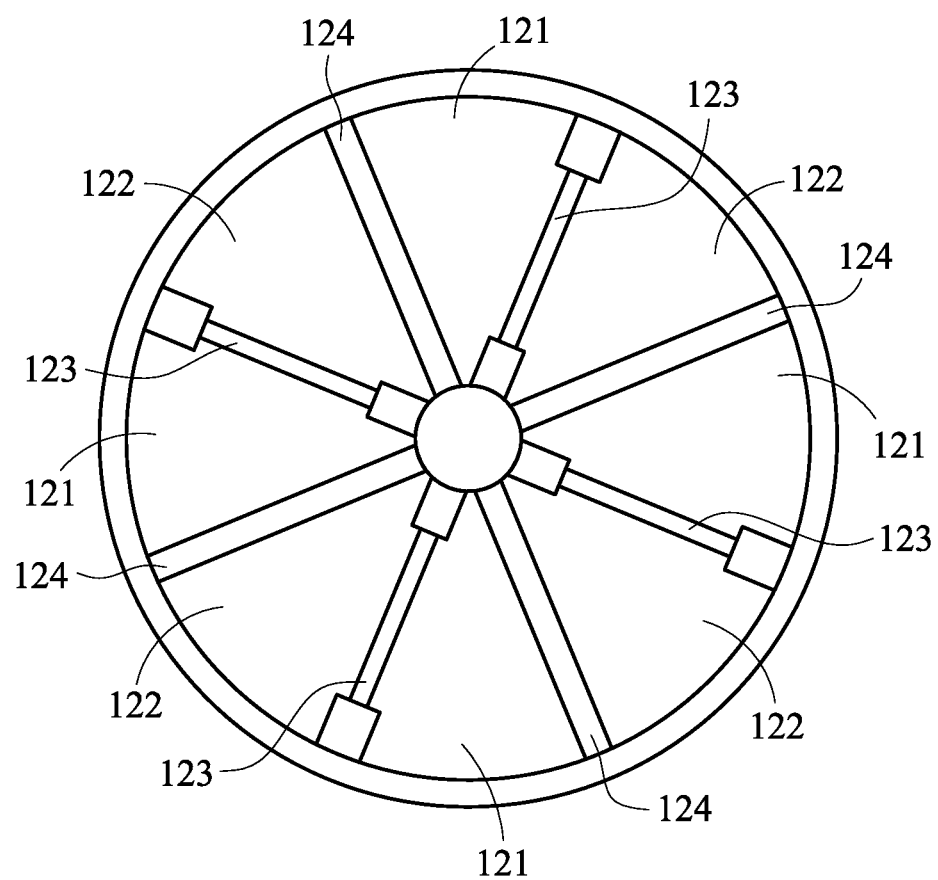
FIG. 10B is a cross-sectional view (taken along line A-A of FIG. 10A) showing that the piston rotor is operated without a pressure difference.
Figure 10C:
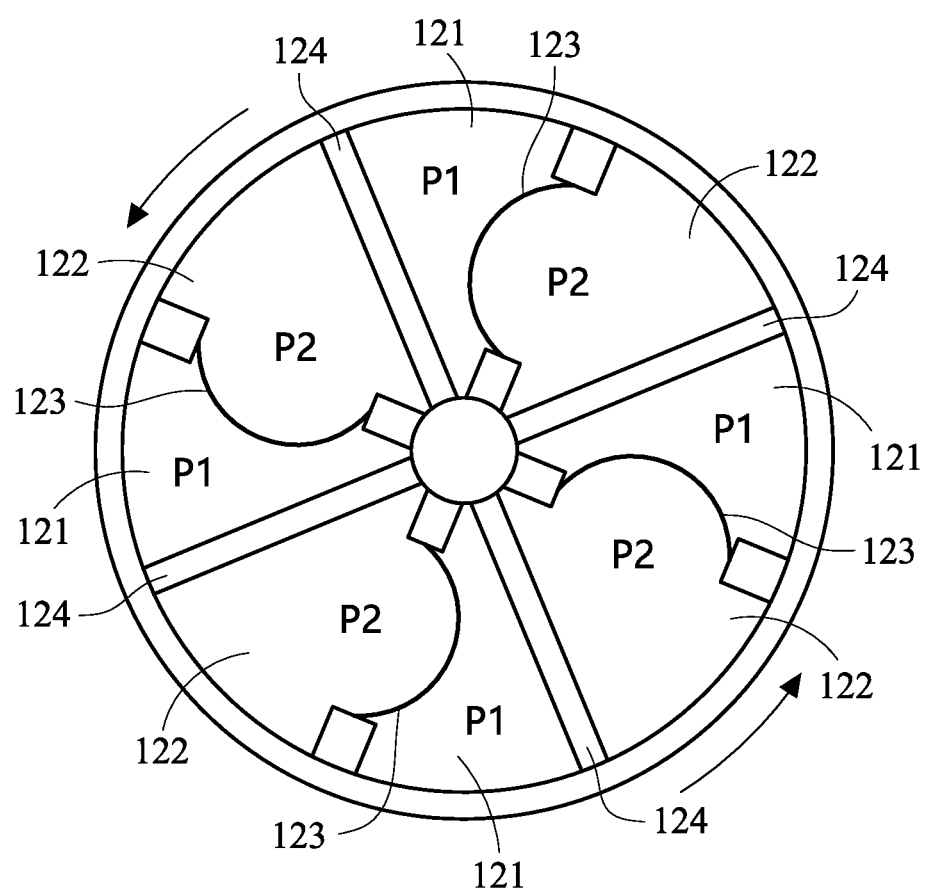
FIG. 10C is a cross-sectional view (taken along line A-A of FIG. 10A) showing that the piston rotor is operated with a pressure difference.
Figure 10D:
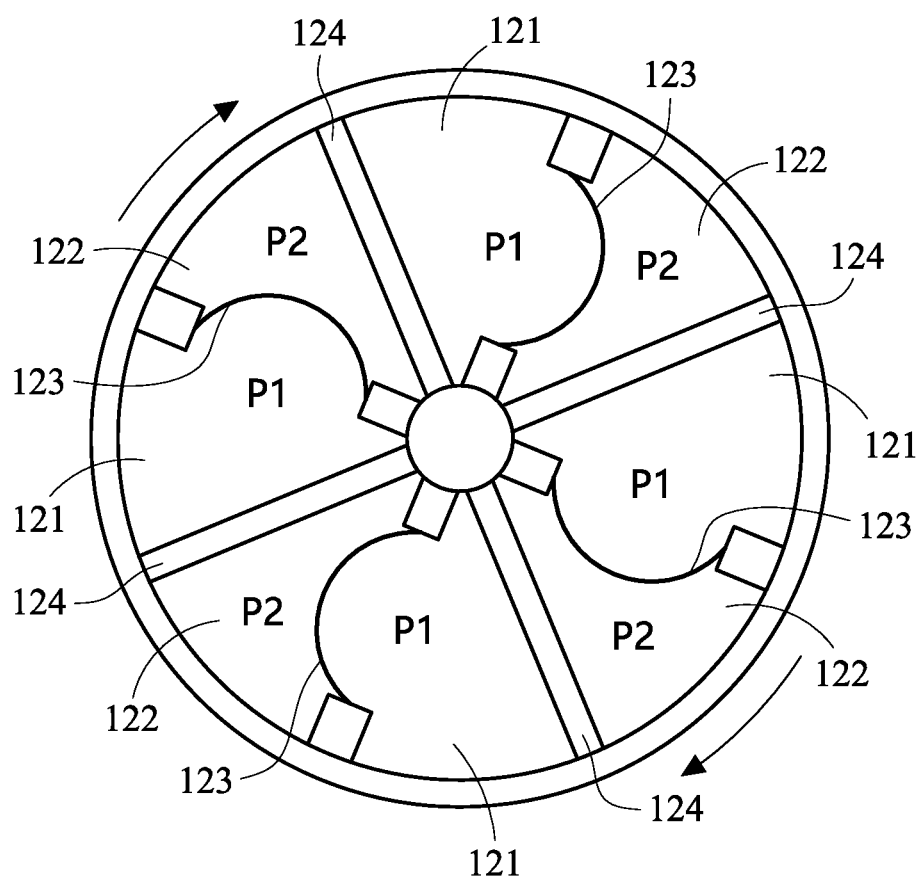
FIG. 10D is a cross-sectional view (taken along line A-A of FIG. 10A) showing that the piston rotor is operated with a pressure difference.

FIG. 10A is a schematic view of a piston rotor 12 of a rotary actuator 1 according to another embodiment of the present invention. FIGS. 10B, 10C, and 10D are cross-sectionals view taken along line A-A of FIG. 10A to show that the piston rotor 12 is operated with or without a pressure difference. Similar to the foregoing embodiments, the depth of each of the first bores 121 and the second bores 122 is less than the thickness T of the piston rotor 12. The difference is that each of the first bores 121 and the second bores 122 does not include a first portion and a second portion, wherein the surface area of the second portion is less than the surface area of the first portion. Instead, a membrane 123 is disposed at the interface of each pair of the first bore 121 and the second bore 122. If the membrane 123 is taken off, the first bore 121 and second bore 122 are in communication. In addition, fixed sheets 124 may be interposed between pairs of the first bore 121 and the second bore 122. The membrane 123 will change in shape under a pressure difference (e.g., ΔP=P2−P1, FIG. 1) between the first space 101 and the second space 102. In contrast, the fixed sheet will not deform under the pressure difference. Other features of the rotary actuator of this embodiment could be the same as the foregoing embodiments.

Referring to FIG. 1 and FIG. 10B, when the first space 101 and the second space 102 have the same pressure (e.g., P1=P2), the membrane 123 is not deformed and the piston rotor 12 remains stationary. Referring to FIG. 1 and FIG. 10C, when the piston rotor 12 is operated with a pressure difference (e.g., ΔP=P2−P1), the piston rotor 12 rotates in a first direction, e.g., a counterclockwise direction. Referring to FIG. 1 and FIG. 10D, when the piston rotor 12 is operated with a pressure difference (e.g., ΔP=P1−P2), the piston rotor 12 rotates in a first direction, e.g., a clockwise direction. By controlling the pressure dop of the rotary actuator, the rotating speed and direction of the piston rotor 12 can be controlled.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/ used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A rotary actuator, comprising:
a sealed container;
a cylindrical piston rotor disposed in the sealed container to divide the sealed container into a first space and a second space along an axial direction of the piston rotor, the first space and the second space having a pressure difference and being isolated from each other by the piston rotor;
wherein the piston rotor comprises a first end surface facing the first space and a second end surface facing the second space, the first end surface is drilled to form a plurality of first bores parallel to the axial direction of the piston rotor, and the second end surface is drilled to form a plurality of second bores parallel to the axial direction of the piston rotor, and
wherein both a depth of each of the plurality of first bores and a depth of each of the plurality of second bores are less than a thickness of the piston rotor in the axial direction, each of the plurality of first bores and each of the plurality of second bores both comprise a first portion and a second portion, and the surface area of the first portion is greater than the surface area of the second portion.

2. The rotary actuator as recited in claim 1, wherein the first space is filled with a first fluid, the second space is filled with a second fluid, and the first fluid and the second fluid are selected from the group consisting of a saturated liquid, a saturated vapor, a saturated gas, a superheated vapor, and a superheated gas.

3. The rotary actuator as recited in claim 2, wherein the pressure of the first space is less than the pressure of the second space, and wherein the first fluid comprises a saturated liquid comprising a hydraulic oil or a lubricating oil, and the second fluid comprises a refrigerant comprising chlorofluorocarbons (CFCs).

4. The rotary actuator as recited in claim 1, wherein the sealed container is operated with an adiabatic process.

5. The rotary actuator as recited in claim 1, wherein the sealed container is operated with a non-adiabatic process.

6. The rotary actuator as recited in claim 1, further comprising a control system for controlling the temperature and pressure of the first space and/or the second space, so as to control the rotating speed of the piston rotor.

7. The rotary actuator as recited in claim 1, wherein the number of the plurality of first bores or the number of the plurality of second bores is odd or even.

8. The rotary actuator as recited in claim 1, wherein the plurality of first bores and the plurality of second bores are alternately arranged.

9. The rotary actuator as recited in claim 8, wherein the surface area of the first portion of the second bore is larger than the surface area of the second portion of the first bore, and the surface area of the second portion of the second bore is less than the surface area of the first portion of the first bore.

10. The rotary actuator as recited in claim 1, wherein the center of the piston rotor includes a shaft, and the rotation of the piston rotor drives the shaft to rotate.

11. The rotary actuator as recited in claim 10, wherein one end of the shaft protrudes from the sealed container and is coupled to a shaft drive device or a transmission device.

12. The rotary actuator as recited in claim 10, wherein one end of the shaft protrudes from the sealed container and is connected to propellers or is connected to the propellers via a transmission device.

13. The rotary actuator as recited in claim 10, further comprising a magnet set and a coil, wherein one end of the shaft protrudes from the sealed container and is connected to the magnet set, and the magnet set is within the coil.

14. The rotary actuator as recited in claim 10, further comprising a magnet set and a coil, wherein one end of the shaft protrudes from the sealed container and is connected to the coil, and the coil is disposed within a magnetic field of the magnet set.

15. A rotary actuator, comprising:
a sealed container;
N cylindrical piston rotors disposed in the sealed container to divide the sealed container into N+1 spaces along an axial direction of the sealed container, wherein N is a positive integer, each two of the N+1 spaces are isolated from each other by one of the N piston rotors, and each of the piston rotors is sandwiched between two of the N+1 spaces with a pressure difference therebetween;
wherein each of the piston rotors comprises a first end surface and a second end surface, the first end surface is drilled to form a plurality of first bores parallel to the axial direction of the sealed container, and the second end surface is drilled to form a plurality of second bores parallel to the axial direction of the sealed container; and
wherein both a depth of each of the plurality of first bores and a depth of each of the plurality of second bores are less than a thickness of the piston rotor in an axial direction of the piston rotor, each of the plurality of first bores and each of the plurality of second bores both comprise a first portion and a second portion, and the surface area of the first portion is greater than the surface area of the second portion.

16. A rotary actuator, comprising:
a sealed container;
a piston rotor disposed in the sealed container to divide the sealed container into a first space and a second space having a pressure difference therebetween;
wherein the piston rotor comprises a first end facing the first space and a second end facing the second space, the first end comprises a plurality of first bores, the second end comprises a plurality of second bores, the plurality of first bores and the plurality of second bores are alternately arranged, and a depth of each of the plurality of first bores and each of the plurality of second bores is smaller than a thickness of the piston rotor; and
wherein a membrane is disposed at the interface of each pair of the first bore and the second bore, and the membrane is deformed under the pressure difference to drive the piston rotor.

17. The rotary actuator as recited in claim 16, further comprising a fixed sheet disposed between every two pairs of the first bore and the second bore.

\* \* \* \* \*